US006236551B1

(12) United States Patent
Jones et al.

(10) Patent No.: US 6,236,551 B1
(45) Date of Patent: *May 22, 2001

(54) SURGE SUPPRESSOR DEVICE

(75) Inventors: Jonathan L. Jones; Richard C. Dunning; Ted K. Kulbieda, all of Carson City, NV (US)

(73) Assignee: PolyPhaser Corporation, Minden, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/591,800

(22) Filed: Jun. 12, 2000

Related U.S. Application Data

(63) Continuation of application No. 09/309,397, filed on May 7, 1999, now Pat. No. 6,115,227, which is a continuation of application No. 09/044,216, filed on Mar. 18, 1998, now Pat. No. 6,061,223.
(60) Provisional application No. 60/062,097, filed on Oct. 14, 1997.

(51) Int. Cl.[7] .................................................... H02H 1/00
(52) U.S. Cl. .............................. 361/119; 361/56; 361/58; 361/127
(58) Field of Search .............................. 361/119, 56, 58, 361/113, 115, 127

(56) References Cited

U.S. PATENT DOCUMENTS

| 3,845,358 | 10/1974 | Anderson et al. | 317/61 |
|---|---|---|---|
| 4,047,120 | 9/1977 | Lord et al. | 330/207 |
| 4,262,317 | 4/1981 | Baumbach | 361/124 |
| 4,359,764 | 11/1982 | Block | 361/119 |
| 4,384,331 | 5/1983 | Fukuhara et al. | 364/431 |
| 4,409,637 | 10/1983 | Block | 361/119 |
| 4,554,608 | 11/1985 | Block | 361/119 |
| 4,563,720 | 1/1986 | Clark | 361/56 |
| 4,689,713 | 8/1987 | Hourtane et al. | 361/118 |
| 4,727,350 | 2/1988 | Ohkubo | 338/21 |
| 4,984,146 | 1/1991 | Black et al. | 363/44 |
| 5,053,910 | 10/1991 | Goldstein | 361/111 |
| 5,057,964 | 10/1991 | Bender et al. | 361/118 |
| 5,122,921 | 6/1992 | Koss | 361/111 |
| 5,321,573 | 6/1994 | Person et al. | 361/56 |
| 5,617,284 | 4/1997 | Paradise | 361/58 |
| 5,667,298 | 9/1997 | Musil et al. | 366/18 |
| 6,115,227 | * 9/2000 | Jones et al. | 361/119 |

* cited by examiner

Primary Examiner—Stephen W. Jackson
(74) Attorney, Agent, or Firm—Sheppard, Mullin, Richter & Hampton LLP; Ketan S. Vakil

(57) ABSTRACT

An apparatus and method for protecting hardware devices using a spiral inductor. The surge suppressor protects hardware devices from electric surges by isolating the radio frequency from an inner conductor. The surge suppressor includes a housing, an inner conductor, a surge blocking device, and a spiral inductor. The surge blocking device is inserted in series with the hardware devices for blocking the flow of electrical energy therethrough. The spiral inductor is coupled to the surge blocking device and is shunted to ground for discharging the electrical surge.

39 Claims, 4 Drawing Sheets

SURGE SUPPRESSOR DEVICE

CROSS-REFERENCE TO RELATED APPLICATIONS

This is a continuation of application Ser. No. 09/309,397, filed on May 7, 1999, now U.S. Pat. No. 6,115,227, issued Sep. 5, 2000 which, in turn, is a continuation of application Ser. No. 09/044,216, filed Mar. 18, 1998, now U.S. Pat. No. 6,061,223, which claims priority from U.S. provisional patent application Ser. No. 60/062,097, filed Oct. 14, 1997, the disclosure of which is incorporated by reference herein in its entirety for all purposes.

BACKGROUND OF THE INVENTION

The present invention generally relates to a surge suppressor and more particularly to a surge suppressor having a spiral inductor and a surge blocking device.

Communications equipment, computers, home stereo amplifiers, televisions, and other electronic devices are increasingly manufactured using small electronic components which are very vulnerable to damage from electrical energy surges. Surge variations in power and transmission line voltages, as well as noise, can change the operating range of the equipment and can severely damage and/or destroy electronic devices. Moreover, these electronic devices can be very expensive to repair and replace. Therefore, a cost effective way to protect these components from power surges is needed.

There are many sources which can cause harmful electrical energy surges. One source is radio frequency (RF) interference that can be coupled to power and transmission lines from a multitude of sources. The power and transmission lines act as large antennas that may extend over several miles, thereby collecting a significant amount of RF noise power from such sources as radio broadcast antennas. Another source of the harmful RF energy is from the equipment to be protected itself, such as computers. Older computers may emit significant amounts of RF interference. Another harmful source is conductive noise, which is generated by equipment connected to the power and transmission lines and which is conducted along the power lines to the equipment to be protected. Still another source of harmful electrical energy is lightning. Lightning is a complex electromagnetic energy source having potentials estimated at from 5 million to 20 million volts and currents reaching thousands of amperes.

Ideally, what is needed is a surge suppression device having a compact size, a low insertion loss, and a low voltage standing wave ratio (VSWR) that can protect hardware equipment from harmful electrical energy emitted from the above described sources.

SUMMARY OF THE INVENTION

The present invention relates to a surge suppressor for dissipating power surges. The surge suppressor protects hardware equipment from electrical energy surges such as lightning. The surge suppressor includes an inner conductor and a spiral inductor. The inner conductor propagates signals therethrough during normal operation and the spiral inductor dissipates electrical energy during a surge condition to a ground connection. The spiral inductor is coupled between the inner conductor and the ground connection. The spiral inductor operates at a predefined RF impedance to ground to conduct the signals along the inner conductor during normal operation to allow the RF signal to pass through the surge suppressor with minimal or no RF signal loss. The predefined RF impedance of the inductor is at least 10 times the operating impedance, i.e., 500 ohms for a 50 ohms system.

The surge suppressor may also include a surge blocking device. The surge blocking device is inserted in series with the protected hardware for blocking the flow of electrical energy therethrough. The surge blocking device will be transparent to the transmitted RF signal, but will be effective in blocking the electrical energy surge from traveling through the inner conductor to the protected hardware. The spiral inductor is coupled to the surge blocking device and is shunted to ground for discharging the electrical energy created by the surge.

When a surge event, such as lightning, occurs, the electrical energy is shunted to ground via the spiral inductor while the surge blocking device blocks the destructive lightning and EMP frequencies and the energy from passing through to the protected hardware.

Advantages of the invention include providing a surge suppressor that is matched to the system impedance to ensure low voltage standing wave ratio (VSWR) which is below 1.1:1 and a low insertion loss which is below 0.1 dB. Furthermore, the surge suppressor provides a large frequency band of operation, a low manufacturing cost, a stacked mechanical assembly for compact size, and low energy and voltage throughput.

A further understanding of the nature and advantages of the inventions herein may be realized by reference to the remaining portions of the specification and the attached drawings.

DETAILED DESCRIPTION OF SPECIFIC EMBODIMENTS

In the description that follows, the present invention will be described in reference to a preferred embodiment that operates as a surge suppressor. In particular, examples will be described which illustrate particular features of the invention. The present invention, however, is not limited to any particular features nor limited by the examples described herein. Therefore, the description of the embodiments that follow are for purposes of illustration and not limitation.

Figure 1:
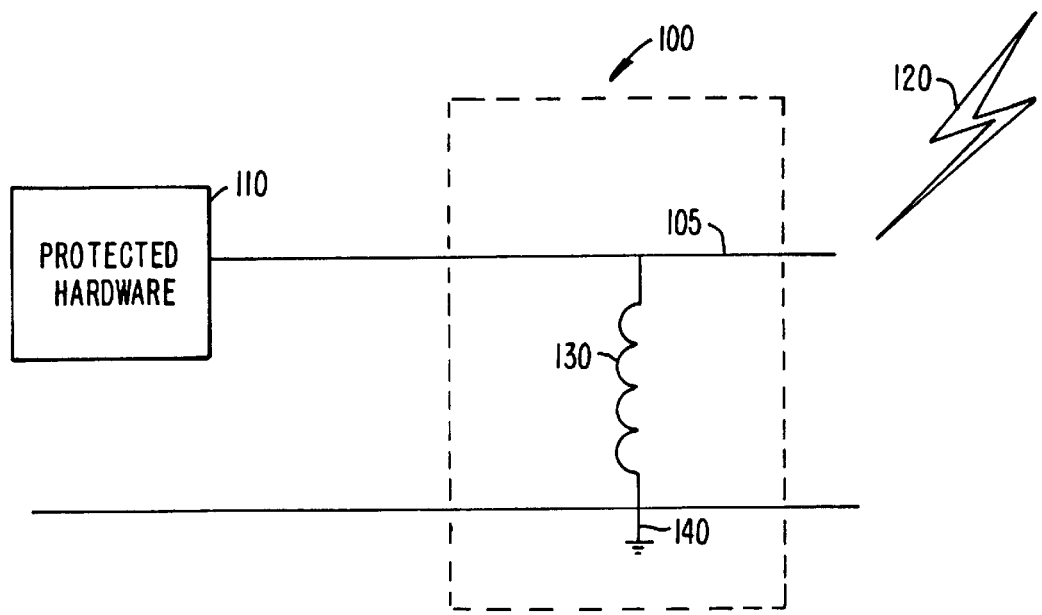
FIG. 1 illustrates a circuit diagram of one embodiment of the surge suppressor in accordance with the present invention.

FIG. 1 illustrates a circuit diagram of one embodiment of the surge suppressor in accordance with the present invention. The surge suppressor 100 protects hardware and equipment 110 from an electrical surge that can damage or destroy the hardware and equipment. A surge condition can arise in many different situations, however, typically arises when a lightning bolt 120 strikes a component or transmission line 105 which is coupled to the protected hardware 110. Lightning surges consist of D.C. electrical energy and AC electrical energy up to approximately 1 MHz in frequency.

Figure 4:
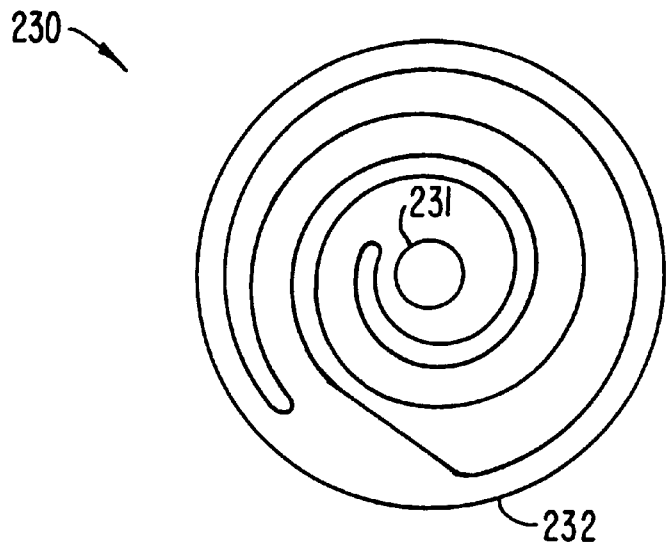
FIG. 4 illustrates a side view of the spiral inductor in accordance with the present invention.

In this embodiment, the surge suppressor 100 includes a spiral inductor 130 having a small foot print design, as shown in FIG. 4. The diameter, surface area, thickness, and shape of the spiral inductor 130 vary depending on the operating frequency and current handling capabilities desired. In the preferred embodiment, an iterative process (described below) is used to determine the diameter, surface area, thickness, and shape of the spiral inductor to meet the user's particular application. The diameter of the spiral inductor 130 of this package size and frequency range is typically 0.865 inches. The thickness of the spiral inductor 130 of this package size and frequency range is typically 0.062 inches. Furthermore, the spiral inductor 130 spirals in an outward direction.

The material composition of the spiral inductor 130 is an important factor in determines the amount of charge that can be safely dissipated across the spiral inductor 130. A high tensile strength material allows the spiral inductor 130 to discharge a greater amount of current. In the preferred embodiment, the spiral inductor 130 is made of a 7075-T6 Aluminum material. Alternatively, any material having a good tensile strength and conductivity can be used to manufacture the spiral inductor 130.

The protected hardware 110 can be any communications equipment, PC computers, network connectors, or any other type of surge sensitive electronic equipment. The protected hardware 110 may also contain a surge blocking device, as shown in FIG. 2, which shields the protected hardware 110 from an electrical surge.

Figure 2:
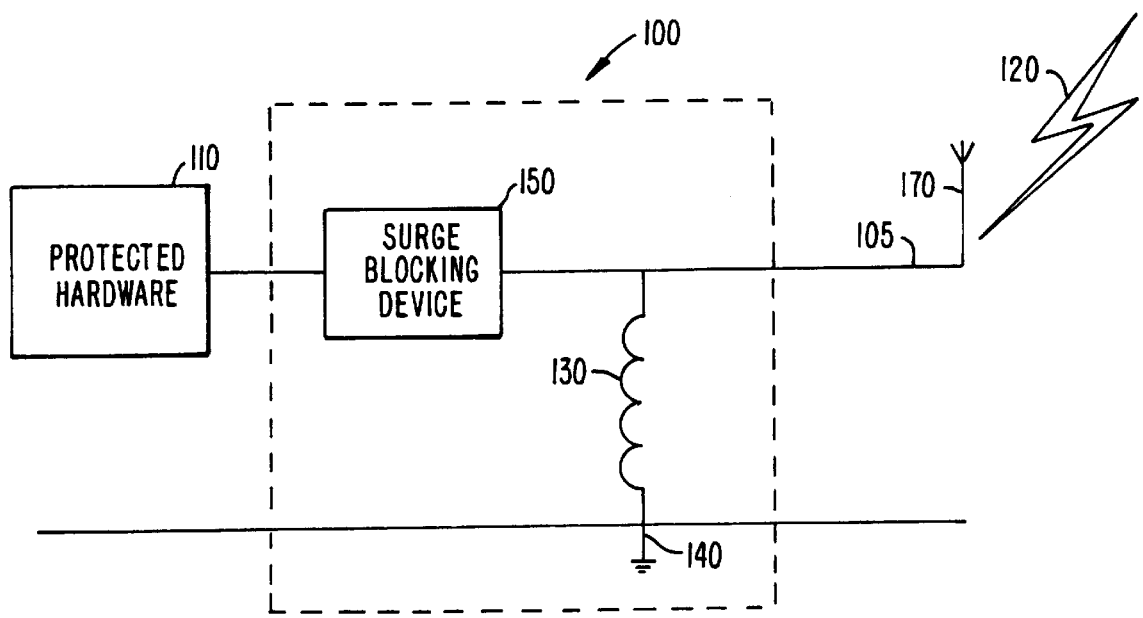
FIG. 2 illustrates a schematic circuit diagram of another embodiment of the surge suppressor in accordance with the present invention.

FIG. 2 illustrates a schematic circuit diagram of another embodiment of the surge suppressor in accordance with the present invention. The surge suppressor 100 is connected to an antenna 170 for receiving a surge. Antenna 170 or any other conducting surface can receive the lightning strike. Preferably, the surge suppressor 100 is positioned nearest to the protected hardware 110 to provide maximum protection.

The preferred embodiment includes a spiral inductor 130 for discharging an electrical surge to ground and a surge blocking device 150 for blocking A.C. and D.C. electrical energy. The spiral inductor 130 of the preferred embodiment has been described above. Typically, the surge blocking device 150 is a capacitive device realized in either lumped or distributed form. Alternatively, the surge blocking device 150 can be parallel rods, coupling devices, conductive plates, or any other device or combination of elements which produce a capacitive effect. The capacitance of the surge blocking device 150 can vary depending on the frequency of operation desired by the user. An iterative process (described below) is preferably utilized to determine the capacitance of the surge blocking device 150.

During normal operation, protected hardware 110 receives and/or transmits RF signals through transmission line 105. Hence, the surge suppressor 100 operates in a bidirectional manner.

During a surge condition, a large amount of electrical energy travels toward the surge blocking device 150. Hence, in this mode of operation the surge suppressor 100 operates in a unidirectional manner. The surge blocking device 150 blocks the electrical energy created by the lightning strike and diverts the electrical energy through the spiral inductor 130 to ground 140. The surge blocking device 150 is designed to pass less than ±3 volts D.C., as per IEC 1000-4-5 8/20 usec 20 kA specification. Spiral inductor 130 should be of sufficient conductivity and cross sectional area to dissipate electrical energy corresponding to the aforementioned signal specification.

In one embodiment, the minimum frequency range of operation is 1.7 GHz to 2.3 GHz; within which the insertion loss is specified less than 0.1 dB and the VSWR is specified less than 1.1:1. The values produced above can vary depending on the frequency range, degree of surge protection, and RF performance desired.

Figure 3:
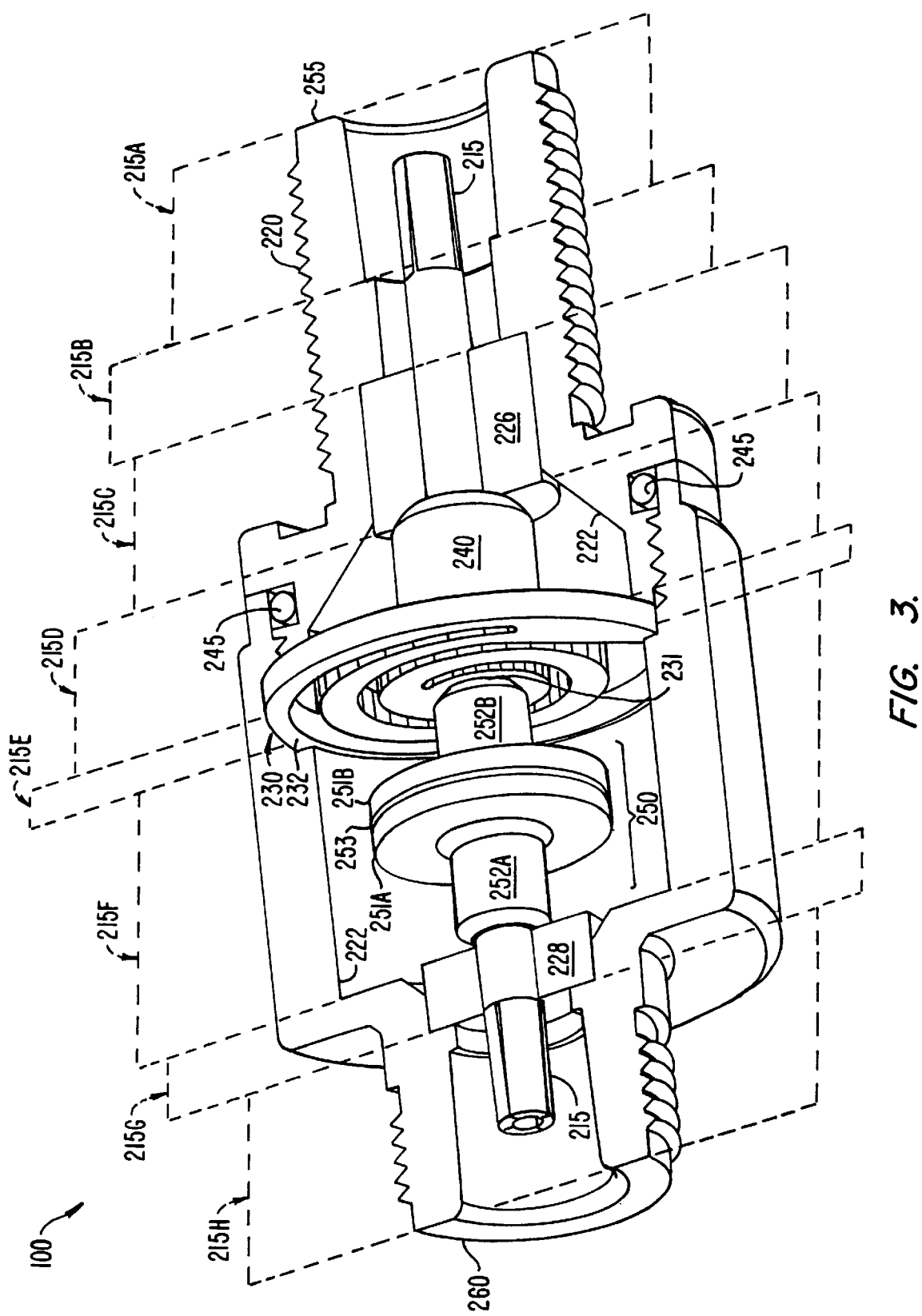
FIG. 3 illustrates a perspective view of the surge suppressor shown in FIG. 2.

FIG. 3 illustrates a perspective view of the surge suppressor shown in FIG. 2. The surge suppressor 100 includes a surge blocking device 250, a spiral inductor 230, an inner conductor 215, and a housing 220 having a cavity 222, a surge port 255, and a protected port 260. The inner conductor 215 is positioned concentric with and located in the cavity 222 of housing 220. The surge port 255 is coupled to transmission line 105 or antenna 170 and the protected port 260 is coupled to the protected hardware 110, as shown in FIGS. 2 and 3.

During a surge condition, the surge propagates into the surge port 255 via the inner conductor 215. Thereafter, the surge is dissipated to a ground connection via the spiral inductor 230. Hence, the surge is prohibited from reaching the protected port 260 and the protected hardware 110.

During normal operating conditions, the inner conductor 215 transmits and receives RF signals. The inner conductor 215 can be made of any conductive material. Typically, the inner conductor 215 is a coaxial cable and is made of a beryllium copper material.

Disposed at various locations throughout the housing 220 are insulating members. Preferably, there is a first and a second 226, 228 insulating member. The insulating members 226, 228 electrically isolates the inner conductor 215 from the housing 220. The insulating members 226, 228 may be made of a dielectric material such Teflon which has a dielectric constant of approximately 2.3. The insulating members 226, 228 are typically cylindrically shaped with a center hole.

The surge suppressor components located inside the cavity 222 of the housing 220 will now be described in detail. The surge suppressor 100 has various segments each of which are structured to form a desired impedance, i.e., 50 ohms. Each adjacent segment is coupled to one another. The various segments will be described starting at surge port 255 and ending at protected port 260. Each segment will be labeled A through H. The inner conductor 215 is located at segments A, B, C, G, and H and has an outer radius of approximately 60 mils.

Segments 215A and 215B include an inner conductor 215 surrounded by an air dielectric. The inner radius of the cavity 222 of segment 215B is approximately 137.8 mils.

Segment 215C includes an inner conductor 215 supported and surrounded by the first insulating member 226. The first insulating member 226 has an inner radius of approximately 57.5 mils, an outer radius of approximately 200 mils, and a length of approximately 325 mils. The inner radius of the cavity 222 is approximately 200 mils.

Segment 215D includes an extender 240 that couples the inner conductor 215 to the spiral inductor 230. Extender 240 is disposed in the cavity 222. At segment 215D, the cavity 222 forms a 45 degree angle. The 45 degree angle allows a low discontinuity match between the 50 ohm line and the spiral inductor 230. The extender 240 has an outer radius of approximately 140 mils and is made of a silver plated brass material.

Segment 215E includes a spiral inductor 230 disposed within the cavity 222. The spiral inductor 230 has an inner radius of approximately 62.5 mils and an outer radius of approximately 432.5 mils. The inner edge 231 of the spiral inductor 230 is coupled to inner conductor 215. The outer edge 232 of the spiral inductor 230 is coupled to housing 220. The spiral inductor 230 may be of a particular known type such as the Archemedes, Logarithmic, or Hyperbolic spiral, or a combination of these spirals. The inner radius of the cavity 222 is approximately 432.5 mils. The housing 220 is coupled to a common ground connection to discharge the electrical energy.

During a surge condition, the electrical energy first reaches the inner edge 231 of the spiral inductor 230. The electrical energy is then dissipated through the spirals of the spiral inductor 230 in an outward direction. Once the electrical energy reaches the outer edge 232, the electrical energy is dissipated to ground through housing 220.

Segment 215F includes a surge blocking device 250 disposed within the cavity 222 which has an inner radius of approximately 400 mils. The surge blocking device 250 is typically a capacitive device realized in either lumped or distributed form. The capacitive device includes two electrodes. The first electrode includes a first plate 251A and a first transition 252A. Likewise, the second electrode includes a second plate 251B and a second transition 252B. The radius of each plate 251A, 251B is approximately 243 mils and the thickness is approximately 50 mils. The radius of each transition 252A, 252B is approximately 92.5 mils and the thickness is approximately 186 mils. Each plate 251A, 251B is more capacitive than each transition 252A, 252B. As a result, the surge blocking device 250 is designed such that the two plates 251A, 251B and two transitions 252A, 252B collectively form approximately a 50 ohm impedance path. Typically, a dielectric material 253 such as Teflon is disposed between the two plates. The thickness of the dielectric material 253 is approximately 20 mils. The distance between the plates can be varied as well as the dielectric material used. The dimensions, shape, size, and distance between the plates are chosen to achieve a desired impedance for the selected frequency range of operation. Alternatively, the surge blocking device 250 may be located outside the housing 220.

Segment 215G includes an inner conductor 215 supported and surrounded by the second insulating member 228. The second insulating member 228 has an inner radius of approximately 57.5 mils, an outer radius of approximately 200 mils, and a length of approximately 150 mils. The size and shape of the insulating members 226, 228 are designed such that they form a structure having a desired impedance, i.e., 50 ohms. The inner radius of cavity 222 is approximately 200 mils.

The housing 220 can be made up of one or more structures for easy disassembly and part replacement. O-rings 245 are used to weather proof the surge suppressor 100 such that no moisture or water can enter the housing 220. As shown in FIGS. 3 and 4, the spiral inductor 230 and the surge blocking device 250 are disposed inside the cavity 222 to achieve a compact size. In one embodiment, the spiral inductor 235 and the surge blocking device 230 are self-aligned within cavity 222.

The surge suppressor 100 is preferably impedance matched to the system to ensure a low VSWR. Typically, the impedance of the surge suppressor 100 is 50 ohms at both the surge port 255 and the protected port 260.

FIG. 4 illustrates a side view of the spiral inductor as shown in accordance with the present invention. The inner edge 231 forms a radius of approximately 62.5 mils. The outer edge 232 forms a radius of approximately 432.5 mils. The spiral inductor 230 spirals in an outward direction. The spiral inductor 230 of a preferred embodiment has three spirals. The number of spirals and thickness of each spiral can be varied depending on the user's particular application.

Figure 5:
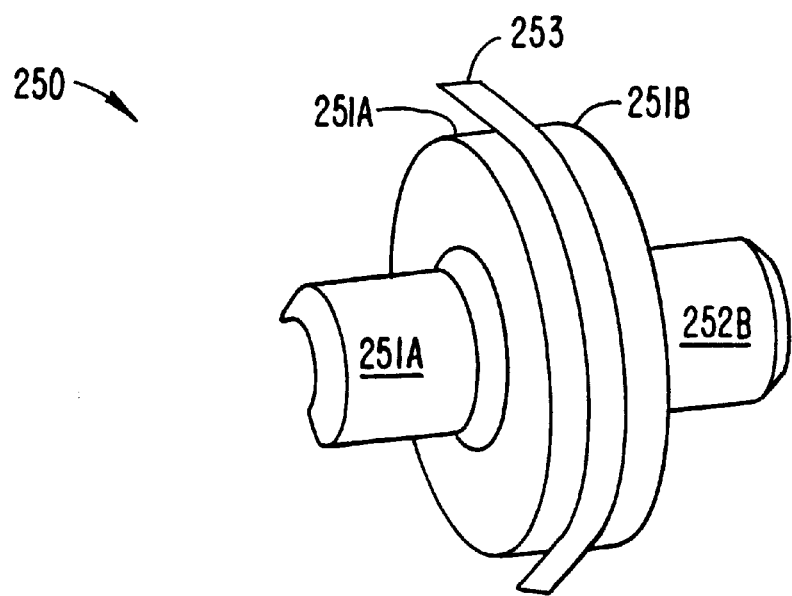
FIG. 5 illustrates a front view of the surge blocking device in accordance with the present invention.

FIG. 5 illustrates a front view of the surge blocking device 250 in accordance with the present invention. The surge blocking device 250 is described throughout the specification, for example, as segment 215F.

Figure 6:
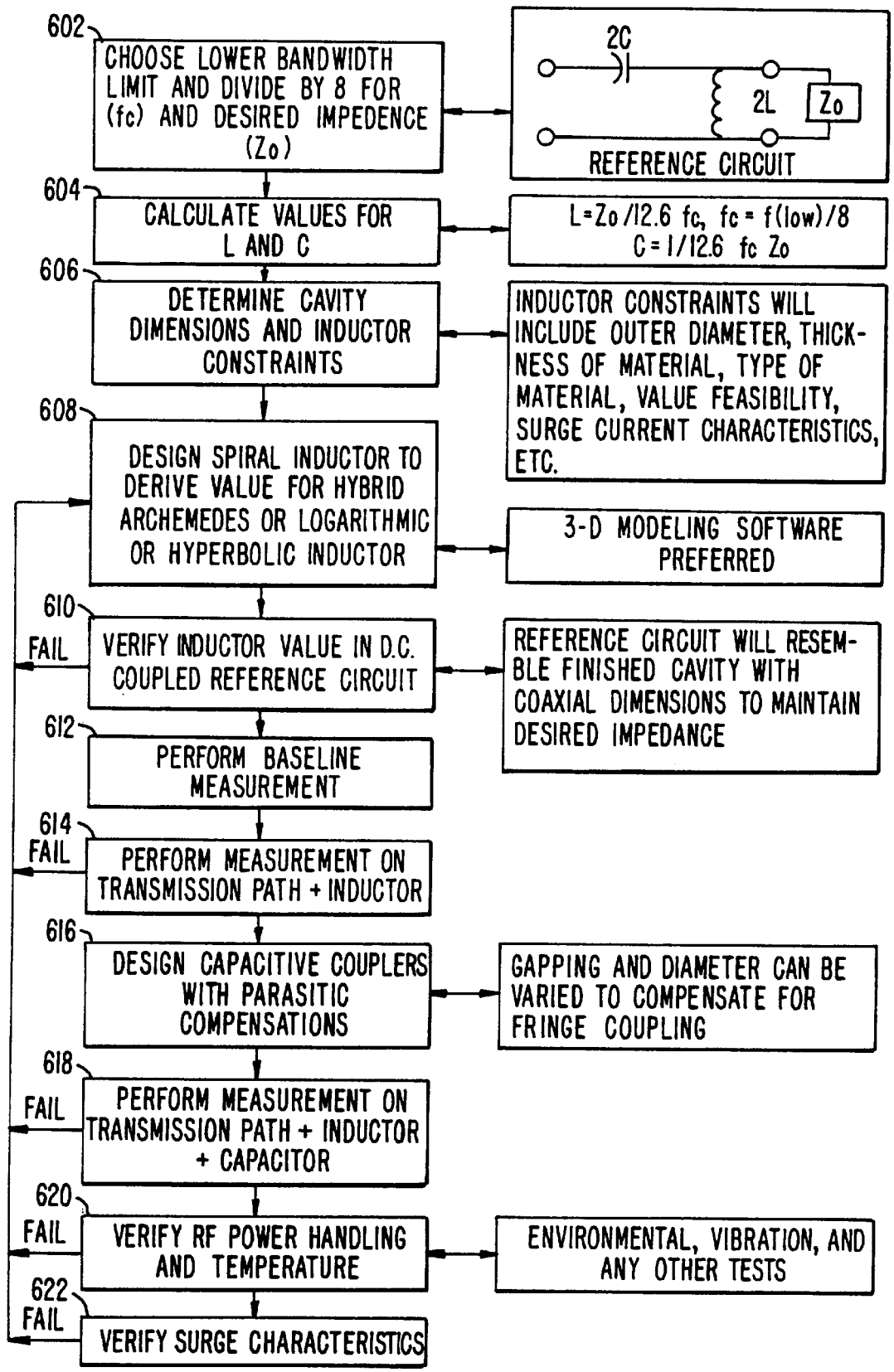
FIG. 6 illustrates an iterative process to determine the inductance of the spiral inductor and the capacitance of the surge blocking device.

FIG. 6 illustrates an iterative process to determine the inductance of the spiral inductor. The iterative process can also be used to calculate the capacitance of the surge blocking device for the user's particular application. Initially at step 602, a cutoff frequency is determined by choosing a lower bandwidth limit and dividing by 8. In addition, a desired impedance is chosen. The cut-off frequency defines the lower end of user bandwidth. The desired impedance is typically 50 ohms, but may be selected to be another value as needed.

Next at step 604, initial values for L and C are calculated using the equations:

$$L=Z_0/(12.6*f_c) \qquad (1)$$

$$C=1/(12.6*f_c*Z_0) \qquad (2)$$

where:

$Z_0$=Desired impedance $f_c$=Cut-off frequency=low operating limit/8

In the preferred embodiment where the −3 dB cut-off frequency is approximately 212 MHz and the desired impedance is 50 ohms, the inductor has a value of 18.7 nH and the capacitive device has a value of 7.5 pF.

Next at step 606, the cavity dimensions of the surge suppressor and inductor constraints are defined. The minimum dimensions of the surge suppressor's cavity are determined largely by the diameter of the connector used, i.e, N-type, BNC, etc. The inductor constraints will include sizing constraints, such as the inner diameter of the cavity, and operating constraints such as the required conductivity, current handling, rigidity, type and thickness of the inductor material used.

Once the inductor's RF value, cavity dimensions and physical constraints are defined, a spiral inductor is designed to meet all of these requirements, as shown in step 608. The designed spiral inductor will possess the calculated inductance to provide the necessary cut-off frequency, and the physical size and shape to fit into the required housing and conduct the necessary current during a surge without failing. The spiral inductor may be of a particular known type such as the Archemedes, Logarithmic or Hyperbolic spiral, or a combination of these spirals. Further, the spiral inductor may be of a shape resulting from two or more overlapped spirals. The spiral inductor is preferably designed using a RF modeling system, such as the HP 85123A, so that a more accurate simulation of the inductor can be performed.

Once the spiral has been designed, it is fabricated, placed in a housing identical to its eventual operating environment, and tested to determine if the measured inductance is approximately equivalent to the desired inductance, as shown in step 610. As is well known in the art, placing a circuit element within a grounded enclosure introduces parasitic effects which must be accounted for if proper operation is to be achieved.

The spiral is tested using conventionally-known RF test equipment such as a HP 8753 automatic network analyzer.

If the test results indicate an unacceptable deviation between measured and desired inductance, the spiral inductor design process is repeated as shown in step 610.

If the measured versus desired inductance is within an acceptable range, a surge suppressor having a thru line is measured, as shown in step 612. The thru measurement is made to provide a baseline insertion loss measurement over the RF frequency of interest. In the preferred embodiment, the frequency range of interest is 1.7 GHz to 2.3 GHz.

Next at step 614, a surge suppressor having a thru line of the same dimensions measured in step 612 and the spiral inductor coupled from the thru line to ground (in shunt) is measured for insertion loss over the RF frequency range of interest. This measurement can then be compared to the previous thru measurement to indicate how much insertion loss degradation occurs with the addition of the shunt spiral inductor. If the insertion loss of the thru line plus shunt inductor is not within an acceptable range, steps 608, 610, and 612 are repeated. Other measurements, for instance, single port measurements may be used instead of, or in addition to the insertion loss measurement for qualifying the surge suppressor.

If the insertion loss of the thru line plus shunt spiral inductor is within an acceptable range, a surge blocking series capacitive device is designed for inclusion within the surge suppressor, as shown in step 616. The capacitive device is designed to possess the calculated capacitance, fit within the specified inner diameter of the cavity, and possess the physical properties to withstand a surge condition. The combination of the thru line, shunt spiral inductor, and series capacitive device may be simulated using a two or three dimensional CAD system. If used, modifications may be made to the design of the shunt spiral inductor, series surge blocking capacitive device and/or their separation to further optimize the surge suppressor's performance. In particular, it has been found that varying the shape and size of the capacitive device's electrodes results in changing the effective inductance of the shunt spiral inductor to further optimize circuit performance.

At step 618, a new surge suppressor incorporating the thru line, the shunt spiral inductor, and the series surge blocking capacitive device is fabricated and tested using the aforementioned or similar testing equipment. If the surge suppressor exhibits unacceptable insertion loss over the desired frequency range, the capacitive device design and/or its location along the thru line may be modified to tune the response to the desired level. Specifically, the capacitive device's gapping, diameter, and dielectric material may be altered to tune the insertion loss response within acceptable limits. If capacitive device modification is unsuccessful in tuning the desired parameter(s) to within acceptable limits, steps 608, 610, 612, 614, and 616 are repeated.

If the surge suppressor exhibits an acceptable insertion loss and/or other qualifying parameters, it is submitted for RF power handling and environmental testing, as shown in step 620. Specifically, the surge suppressor is exposed to high levels of RF energy and environmental, temperature and vibrational conditions likely to be experienced during operation. If the surge suppressor fails to operate over a predetermined range, steps 608, 610, 612, 614, 616, and 618 are repeated.

If the surge suppressor has sufficient RF power handling capability and is able to withstand an acceptable range of environmental stress, it is subjected to surge qualification, as shown in step 622. Surge qualification may entail exposing the surge suppressor to high current pulses under various environmental conditions to simulate a lightning strike.

Other embodiments of the design process are of course possible. For instance, in the embodiment of the surge suppressor having only a shunt spiral inductor, only steps 606, 608, 612, 614, 620 and 622 need be performed. Specifically, only the inductance value of the spiral shunt inductor need be determined and tested. Subsequently, the insertion loss and/or other parameter(s) of a thru line is used as the qualifying parameter to determine if the thru line plus the shunt spiral inductor operates within an acceptable window within the desired frequency range. Finally, RF power handling, environmental, and surge qualification occurs as described above.

Although the preferred embodiment is shown with a particular capacitive device and a spiral inductor, it is not required that the exact elements described above be used in the present invention. Thus, the values of the capacitive device and the spiral inductor are to illustrate one embodiment and not to limit the invention.

The invention has now been explained with reference to specific embodiments. Other embodiments will be apparent to one of ordinary skill in the art. It is therefore not intended that this invention be limited, except as indicated by the appended claims.

What is claimed is:

1. A surge suppressor comprising:

a conductor configured to receive an electrical surge; and an inductor having an inner arc and an outer arc, the inner arc having a smaller radius than the outer arc, the inductor being positioned proximate to the conductor so that the electrical surge can propagate from the conductor to the inductor.

2. A surge suppressor as defined in claim 1, wherein the conductor defines an axis and the inductor defines a first plane that is substantially perpendicular to the axis.

3. A surge suppressor as defined in claim 2, further comprising a capacitive device positioned along a second plane that is substantially parallel to the first plane.

4. A surge suppressor as defined in claim 3, wherein the capacitive device is selected from a group consisting of a capacitor, parallel rods, coupling devices, and conductive plates.

5. A surge suppressor as defined in claim 1, wherein the conductor is a coaxial line.

6. A surge suppressor as defined in claim 1, further comprising a capacitor that blocks the electrical surge so that the electrical surge travels from the inner arc to the outer arc.

7. A surge suppressor as defined in claim 6, wherein the outer arc is connected to a ground that discharges the electrical surge.

8. A surge suppressor as defined in claim 1, farther comprising a housing having a cavity configured to hold the conductor and the inductor therein.

9. A surge suppressor as defined in claim 8, further comprising a capacitor positioned proximate to the inductor and disposed within the cavity.

10. A surge suppressor as defined in claim 1, wherein the inductor has an impedance of at least 500 ohms at a frequency of between 1.7 GHz and 2.3 GHz.

11. A surge suppressor comprising:

a housing defining a chamber having a central axis;

a conductor disposed in the chamber of the housing and extending substantially along the central axis of the chamber, the conductor configured to carry an A.C. signal and a D.C. surge;

an inductor having an inner arc connected to the conductor and an outer arc connected to the housing, the inner arc having a smaller radius than the outer arc, the inductor having a curved shape between the inner arc and the outer arc; and a capacitive device connected to the conductor and configured to block the D.C. surge so that the D.C. surge is directed along the inductor, from the inner arc to the outer arc, to the housing.

12. A surge suppressor as defined in claim 11, wherein the housing discharges the D.C. surge.

13. A surge suppressor as defined in claim 11, further comprising a ground connected to the housing, to discharge the D.C. surge.

14. A surge suppressor as defined in claim 11, wherein the capacitive device is positioned in the chamber of the housing.

15. A surge suppressor as defined in claim 11, wherein the capacitive device has a first capacitive plate and a second capacitive plate coupled with the inductor, the first capacitive plate substantially parallel to the second capacitive plate.

16. A surge suppressor as defined in claim 11, wherein the conductor has a central axis that is positioned in substantially alignment with the central axis of the chamber of the housing.

17. A surge suppressor as defined in claim 11, wherein the inductor has a central axis that is positioned in substantially alignment with the central axis of the chamber of the housing.

18. A surge suppressor comprising:

means for propagating a signal and a surge;

means for blocking the surge coupled to the means for propagating; and means for shunting the surge to a ground coupled to the means for propagating wherein the means for shunting provides a planar curved path.

19. A surge suppressor as defined in claim 18, wherein the means for propagating is an inductor having an inner arc and an outer arc, the inner arc having a smaller radius than the outer arc, the inductor having a curved shape between the inner arc and the outer arc.

20. A surge suppressor as defined in claim 18, wherein the means for blocking the surge passes less than ±3 volts D.C.

21. A surge suppressor as defined in claim 20, wherein the means for blocking the surge is selected from a group consisting of a capacitor, parallel rods, coupling devices, and conductive plates.

22. A surge suppressor as defined in claim 1, further comprising two conductive plates positioned substantially parallel to one another, positioned proximate to the inductor, and configured to block the electrical surge.

23. A surge suppressor as defined in claim 8, wherein the housing comprises two structures detachable from one another.

24. A surge suppressor as defined in claim 11, wherein the housing comprises two structures detachable from one another.

25. A surge suppressor as defined in claim 15, further comprising a dielectric material sandwiched between the first capacitive plate and the second capacitive plate.

26. A surge suppressor as defined in claim 20, wherein the means for shunting the surge is an inductor having a planar configuration.

27. A surge suppressor comprising:

a housing defining a chamber having a central axis, the housing being connectable to a ground;

a conductor disposed in the chamber of the housing and extending substantially along the central axis of the chamber;

an inductor disposed in the chamber of the housing, the inductor having
an inner edge coupled to the conductor,
an outer edge coupled to the housing, and
curved planar member configured to facilitate an electrical flow path for a D.C. surge from the conductor to the housing; and a capacitor connected in line to the conductor and configured to block the D.C. surge so that the D.C. surge is directed along the curved planar member of the inductor to the housing.

28. A surge suppressor as defined in claim 26, wherein the housing comprises two structures detachable from one another.

29. A surge suppressor as defined in claim 26, further comprising an insulating member to electrically isolate the conductor from the housing.

30. A surge suppressor as defined in claim 26, wherein the curved planar member has a shape selected from a group consisting of an archemedes spiral, logarithmic spiral, and hyperbolic spiral.

31. A surge suppressor as defined in claim 26, wherein the inductor further comprises a second curved planar member configured to facilitate another electrical flow path for the D.C. surge from the conductor to the housing.

32. A surge suppressor as defined in claim 31, wherein the second curved planar member has a shape selected from a group consisting of archemedes spiral, logarithnic spiral, and hyperbolic spiral.

33. A surge suppressor as defined in claim 27, wherein the inductor further comprises an inner ring forming the inner edge and connected to the curved planar member.

34. A surge suppressor as defined in claim 27, wherein the inductor further comprises an outer ring forming the outer edge and connected to the curved planar member.

35. A surge suppressor as defined in claim 27, wherein the capacitor has a first capacitive plate and a second capacitive plate coupled with the inductor, the first capacitive plate substantially parallel to the second capacitive plate.

36. A surge suppressor as defined in claim 35, wherein the capacitor further comprises a dielectric material sandwiched between the first capacitive plate and the second capacitive plate.

37. A surge suppressor as defined in claim 27, wherein the capacitor passes less than ±3 volts D.C.

38. A surge suppressor as defined in claim 27, wherein the capacitor is disposed within the chamber of the housing.

39. A surge suppressor as defined in claim 27, wherein the conductor is a coaxial line.

* * * * *